United States Patent
Förster

(10) Patent No.: US 6,915,885 B2
(45) Date of Patent: Jul. 12, 2005

(54) OSCILLATION DAMPER WITH ADJUSTABLE DAMPING FORCE

(75) Inventor: Andreas Förster, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/215,874

(22) Filed: Aug. 9, 2002

(65) Prior Publication Data

US 2003/0029684 A1 Feb. 13, 2003

(30) Foreign Application Priority Data

Aug. 9, 2001 (DE) .......................................... 101 39 222

(51) Int. Cl.⁷ .............................. F16F 9/50; F16F 9/348; F16F 9/46; B60G 17/08
(52) U.S. Cl. ............................... 188/266.3; 188/282.5; 188/266.5; 188/322.13; 188/282.2
(58) Field of Search ..................... 188/322.15, 282.5, 188/317, 316, 318, 266.5, 266.3, 282.2, 282.8, 282.9, 289, 291, 294, 322.13, 322.22, 350, 156, 157, 158, 159, 162, 196 F; 464/40, 54, 64, 148; 192/54.1, 55.1, 55.5; 137/625.25, 625.34, 625.65, 625.69, 596.17; 251/129.01, 129.11, 129.19

(56) References Cited

U.S. PATENT DOCUMENTS

| | | | | |
|---|---|---|---|---|
| 4,527,676 A | * | 7/1985 | Emura et al. ............. | 188/266.4 |
| 4,620,620 A | * | 11/1986 | Johnston et al. .......... | 188/266.4 |
| 4,635,765 A | * | 1/1987 | Schmidt ................... | 188/266.3 |
| 4,754,855 A | * | 7/1988 | Kuwana et al. ........... | 188/266.4 |
| 6,293,377 B1 | | 9/2001 | Okada et al. ............. | 188/282.2 |

FOREIGN PATENT DOCUMENTS

| | | | | |
|---|---|---|---|---|
| DE | 29 45 015 | 10/1981 | ............. | F16F/9/44 |
| DE | 33 12 899 | 6/1985 | ............. | F16F/9/46 |
| DE | 34 08 267 | 9/1985 | ............. | F16F/9/48 |
| DE | 35 42 846 | 6/1987 | ........... | B60G/17/06 |
| DE | 34 46 133 | 12/1990 | ........... | B60G/17/08 |
| DE | 40 06 406 | 6/1991 | ............. | F16F/9/46 |
| DE | 39 40 290 | 7/1991 | ............. | F16F/9/46 |
| DE | 35 42 846 | 9/1993 | ........... | B60G/17/06 |
| EP | 0 155 102 | 9/1985 | ............. | F16F/9/46 |
| GB | 2187 346 | 9/1987 | ............. | H02P/7/00 |

* cited by examiner

Primary Examiner—Douglas C. Butler
(74) Attorney, Agent, or Firm—Cohen, Pontani, Lieberman & Pavane

(57) ABSTRACT

Oscillation damper with variable damping force, comprising a valve device, in which an actuator for adjusting the valve device performs a rotary motion against the spring force of a torsion spring, the position of the valve device being determined from the manipulated variable of the actuator and the reaction force of the torsion spring.

17 Claims, 5 Drawing Sheets

OSCILLATION DAMPER WITH ADJUSTABLE DAMPING FORCE

BACKGROUND OF THE INVENTION

1. Field of the Invention

The invention relates to an oscillation damper with a variable damping force including a valve device and an actuator for the valve device which performs a rotary motion against the spring force of a torsion spring.

2. Description of the Related Art

Oscillation dampers with a variable damping force achieve a large adjustment range as regards the damping force by having a plurality of valve devices or because an adjusting device can itself cover a large adjustment range. A large adjustment range can be achieved by implementing a significantly large difference in damping force with just a small adjusting movement of the valve device. The difference in damping force generally corresponds to a difference in the cross section of a valve opening. However, relatively high accuracy in the adjustment of the valve device is required for this purpose. If only a small difference in damping force is achieved in relation to an adjusting movement, it is possible either to apportion the damping force more finely or to use components that are less accurate.

However, a large adjustment travel is also associated with a more powerful adjusting device, which is correspondingly expensive. U.S. Pat. No. 6,293,377 describes an oscillation damper with an adjustable damping force, in which an electric motor is connected by its rotor to a driving-force conversion mechanism that converts a rotary motion of the rotor into an axial motion of a valve element. It is completely irrelevant for the action of the force of an electric motor how large the adjustment travel is. An adjusting device of this kind therefore appears particularly advantageous. In this connection, attention is drawn to DE 34 08 267, which has already described a driving-force conversion mechanism. When using an electric motor, the angle of rotation of the rotor required to achieve a defined damping-force setting must be determined. One known method of achieving this is to use a stepping motor. The special way in which this type of motor can be activated results in a defined angle of adjustment of the rotor, which, in turn, corresponds to a defined adjustment travel of the valve element. However, to the knowledge of the applicant, stepping motors of this kind are not available in the range of diameters that would be necessary for implementation within a hollow piston rod.

Another possibility is to have the electric motor run into a stop in order to define an angle of rotation. However, it is only possible to define a small number of angles of rotation in this way. A solution of this kind is known from DE 35 42 846 A1, for example.

The use of stops to determine the position of a valve element in conjunction with an electric motor involves another problem, which can incidentally also arise if the valve element is embodied as a seat valve that can be moved into the maximum closed position. When the stop is encountered or the valve seat is occupied, very high impact torques occur, these going far beyond the rated motor torque. Either a certain wear is accepted or use is made of a control system of the type known from GB 2,187,346, which describes an electrical circuit that significantly reduces the motor torque before the stop is reached and hence brakes the stop.

SUMMARY OF THE INVENTION

It is an object of the present invention to implement an oscillation damper with an adjustable damping force, in which the problem of the torque peaks that occur has been eliminated, the position of the valve element can be determined in a simple manner and basic setting of the damping force can be implemented in a simple manner.

According to the invention, the partial object of determining the position of the valve element is achieved by virtue of the fact that the position of the valve device is determined from the manipulated variable of the actuator and the reaction force of the torsion spring.

The major advantage of this measure is that a very large number of angular positions of the valve device can be set without providing a stop or an electrical switch device in each case for this purpose. This simplifies the entire construction of the valve device.

It has proven particularly advantageous if the actuator is embodied as an electric motor. The spring force rises in proportion to the motor current, which is a manipulated variable. Consequently, the position of the valve device can be detected from the pair of values comprising the motor current and the angle of rotation.

As a further refinement of the invention, provision is made for the torsion spring to be in operative connection with a rotor of the actuator, on the one hand, and with a housing of the actuator, on the other hand. This combination of components can be preassembled independently of an oscillation damper.

For this purpose, the torsion spring is embodied as a helical spring, which has a winding portion fixed against rotation on the housing and a winding portion fixed against rotation relative to the rotor.

The partial object of reducing torque peaks is achieved in the case of an oscillation damper with a variable damping force and an actuator which is provided with means that reduce an impact of a component connected to the actuator and performing a rotary motion by virtue of the fact that the means are embodied as an overload clutch, which are arranged within the drive line to the valve device.

A significant advantage is that it is possible to adopt an end position at the maximum driving power of the actuator. There is no delay due to the necessity of reducing the driving power ahead of the stop.

Thus, for example, provision is made for the overload clutch to have a torque input part and a torque output part, which are clamped against one another by a spring.

A significant simplification of the construction of the overload clutch is achieved by virtue of the fact that the spring is embodied as a helical tension spring. If, for example, the helical tension spring is supported, on the one hand, by means of an operative connection to the torque input part and, on the other hand, by means of an operative connection to the torque output part, the parts of the clutch preload each other without the need for an additional force support for the spring.

In a further advantageous refinement, a sleeve of one clutch half is introduced into an opening of the other clutch half to position the torque input part relative to the torque output part. Given a radial clearance between the sleeve and the opening, the possibility of a radial offset that compensates for angular errors within the drive line from the actuator to the valve device, if required, is achieved.

The partial object of simple basic setting of the damping force of the oscillation damper, the actuator being connected to a spindle, which converts the rotary motion of the actuator into an axial motion of the valve device, is achieved by providing the spindle with a rotational retention means, which comprises an anti-rotation safeguard for the valve device relative to an adjusting ring that can move in the circumferential direction. It is possible to fix the adjusting ring relative to a component, the location of which is fixed relative to the rotary motion of the actuator, thereby allowing the valve device driven by the spindle to be adjusted axially relative to the spindle.

The axial adjustability of the spindle allows compensation of manufacturing tolerances and adaptation of the valve device to required damping-force characteristics.

For this purpose, the anti-rotation safeguard is formed by a transverse pin, which engages in at least one groove of the adjusting ring.

The adjusting ring can furthermore be fixed to the fixed-location component by means of latching means.

There are a number of possibilities for the design configuration of the latching means. The latching means can be formed by at least one spring-loaded latching body, for example.

In this arrangement, the latching bodies are preloaded by an expanding spring.

A particularly space-saving and easy-to-manufacture solution is achieved by virtue of the fact that spring-leaf segments of an expanding spring form the latching bodies.

Irrespective of the configuration of the latching bodies, they engage in a receptacle of the fixed-location component. Provision is made for the fixed-location component to be formed by a component connected firmly to the piston rod.

In order to be able to achieve a compact drive line for the valve device within the oscillation damper, the spindle is arranged within a hollow piston rod, and this hollow piston rod has a piston-rod extension, which comprises the at least one receptacle for the at least one latching body.

A spindle often has a thread backlash, which can be reduced, in the case of particularly precise drives, by means of balls within the thread. An alternative solution is for the spindle to be preloaded by a compression spring and hence for the thread flanks to be in contact within the spindle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
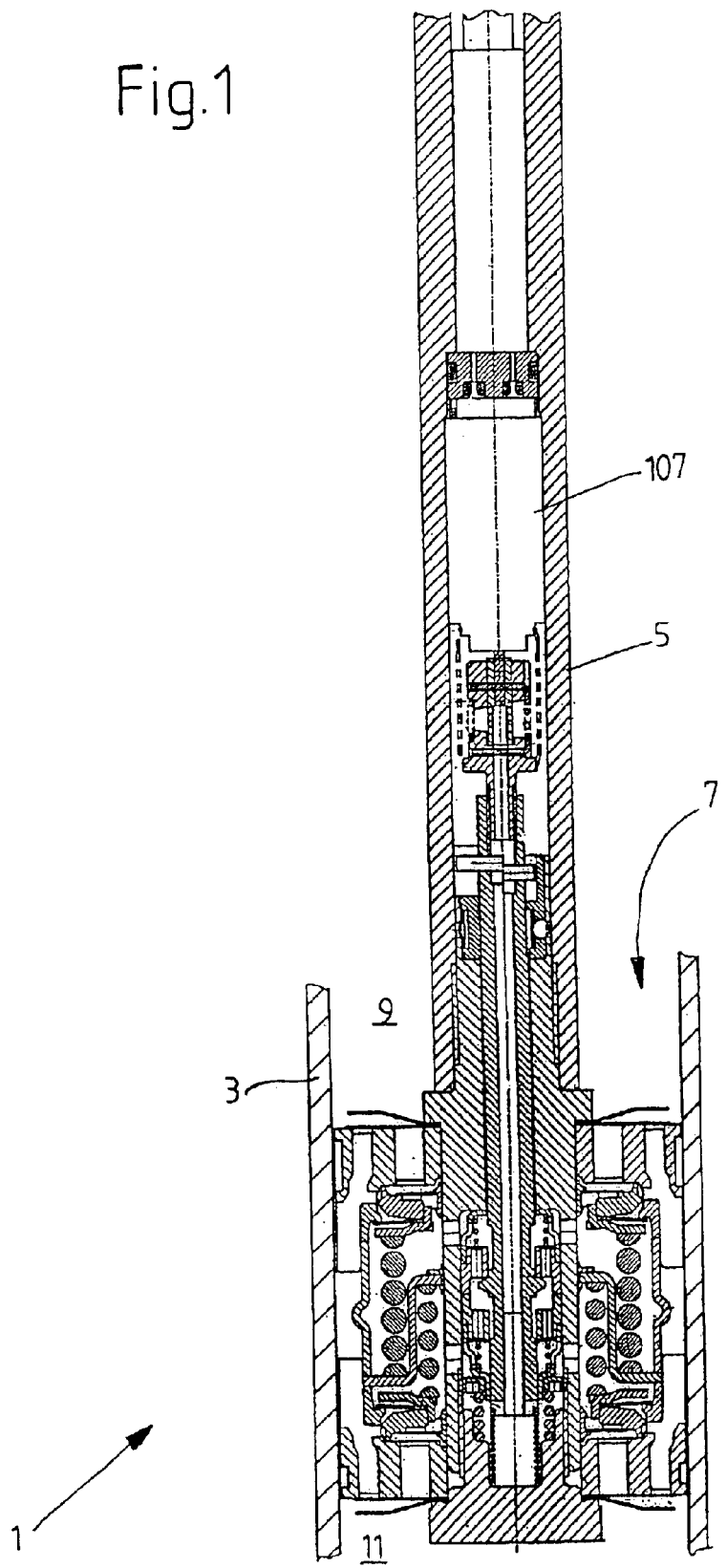
FIG. 1 shows a fragmentary view of the oscillation damper according to the invention.

FIG. 1 shows a fragmentary view of an oscillation damper 1 independently of a specific design, which has an axially movable piston rod 5 in a cylinder 3. Attached to the piston rod is a piston 7, which divides the cylinder, which is filled with a damping medium, into a working space 9 at the piston-rod end and a working space 11 at the opposite end from the piston rod.

The piston 7 comprises a central sleeve 13, on the end of which end rings 15; 17 are arranged, these in turn being clamped in firmly in the axial direction on a piston-rod extension 23 by end flanges 19; 21. Both end flanges 19; 21 carry piston rings 25, 27, thus preventing leakage between the piston and the cylinder. Two main-stage valve bodies 31; 33 are clamped between the end flanges 19; 21 and a common dividing sleeve 29 by means of respective valve springs 35; 37. With the piston-rod extension 23, the central sleeve 13 and the end rings 15; 17, the dividing sleeve 29 forms respective separate control spaces 39; 41, the instantaneous pressure in which acts in the closing direction on the side of the associated main-stage valve bodies 31; 33 facing the control space.

The two end flanges 19; 21 have radially inner inflow openings 43; 45 leading into the respective control spaces 39; 41. Formed radially to the outside of the inflow openings are main-stage passages 47; 49, which are covered at the ends by respective nonreturn valve disks 51; 53.

Formed between the end flanges 19; 21 and the associated main-stage valve bodies 31; 33 is at least one radial outflow opening 55; 57, which allows a flow of damping medium from the inflow openings 43; 45 into the main-stage passages 47; 49 as a function of the position of the main-stage valve bodies 31; 33.

A small constant aperture, which allows damping medium to flow into the control space 39; 41, is machined into a cover disk 59; 61 associated with the main-stage valve body 31; 33. Formed within the piston-rod extension 23 are separate radial openings 63; 65 for the two control spaces 39; 41. These openings allowing the damping medium to flow into a valve space 67. The valve space 67 extends from an end wall 69 of the piston-rod extension 23 as far as a lower guide ring 71 of an axially adjustable valve device 73. The valve device 73 is of tubular design and extends into the hollow piston rod 5. Arranged concentrically with the valve device 73 are two valve rings 75; 77, which have nonreturn valves 79; 81 opening in opposite directions. The valve device 73 has two valve-seat surfaces 83; 85 and two valve-spool surfaces 87; 89 (FIGS. 4–7). Different damping forces are obtained, depending on the position of the valve device 73 relative to the valve rings 75; 77, more details of this technical relationship being given in the context of FIGS. 4 to 7.

The nonreturn valves 79; 81 in the valve rings 75; 77 are formed by cover disks 91; 93, which are preloaded by a closing spring 95, 97, which is supported on a valve sleeve 99; 101. Each of the two nonreturn valves 79; 81 can thus be preassembled completely outside the oscillation damper 1.

Together with the valve sleeve 101, the guide ring 71 seals off the valve space 67 in a hydraulically leaktight manner or at least restricts the exchange of medium. For this purpose, the valve sleeve 101 forms a gap seal with the valve device 73. As an alternative, the valve device or the valve sleeve can be embodied with a sealing ring, which, in view of the power requirement of the actuator, should be chosen so that it exhibits as little friction as possible. A retaining spring 103 ensures that the threaded joint between the guide ring 71 and the piston-rod extension 23 remains fixed. A gap 105 between the piston-rod extension and the valve device ensures that an actuator 107 (FIG. 1) arranged above the valve device, a connecting passage 109 and a collecting space 111 situated underneath the guide ring 71 are separated from the valve space 67, the control spaces 39; 41 and the working spaces 9; 11. Any leakage has no effect on the flow conditions at the valve device and the main-stage valve bodies.

Figure 3:
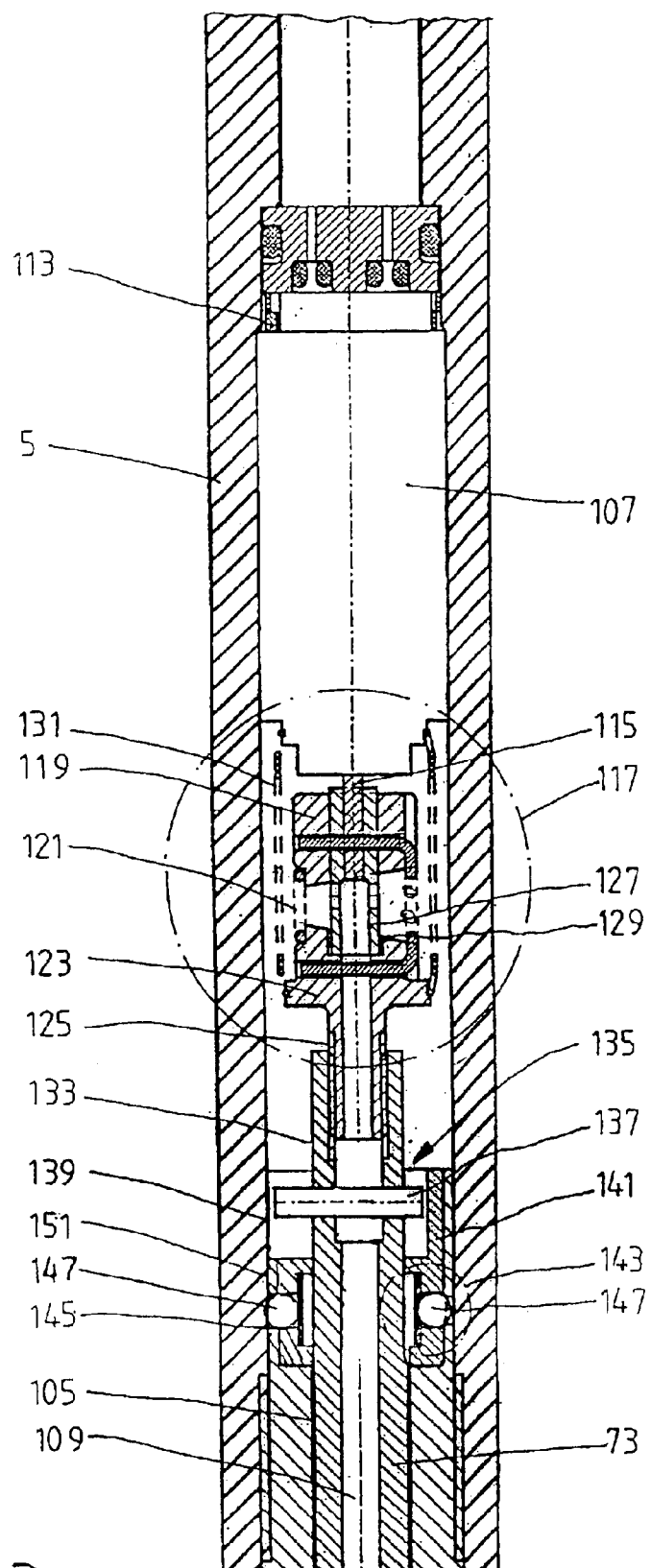
FIG. 3 shows a portion of the piston rod as a separate part.

FIG. 3 shows the part of the piston rod 5 above the piston 7. The actuator 107 in the preferred form of an electric motor is arranged axially in series with the valve device. The electric motor is a direct-current motor, which is connected as a self-contained subassembly to the piston rod. For this purpose, the housing of the actuator has a clamping ring 113, which is in frictional engagement with the inner wall of the piston rod.

An extension of the rotor 115 of the actuator 107 is in operative connection with a clutch, which is embodied as an overload clutch 117 subject to frictional force. Connected to the extension is a torque input part 119, which is connected to a first end by means of a tensile helical torsion spring 121. The other end of the tensile helical torsion spring is connected to a torque output part 123, which has a threaded portion 125 that provides power transmission to the valve device 73. The mutually facing surfaces of the torque flanges form friction faces, which are preloaded against one another by the tensile helical torsion spring 121. A sleeve 127 of the torque input part engages in a blind opening 129 of the torque 119 output part. The torque input part and the torque output part can move radially relative to one another to a limited extent. To prevent the helical tension spring 121 from being pulled off the torque flange during the operation of the clutch, each end is passed radially through the torque input part 119 or output part 123.

In a fixed location relative to the piston rod, a torsion spring 131 is connected to the torque output part. In this exemplary embodiment, the torsion spring is fixed on the housing of the electric motor 107 by means of a winding portion and provides a restoring force on the valve device 73, starting from a predetermined zero position, in which the torsion spring has the lowest preload, since the other end of the torsion spring is fixed on the torque input part 123 and hence in a fixed location relative to the rotor 115 by means of a winding portion.

Figure 3A:
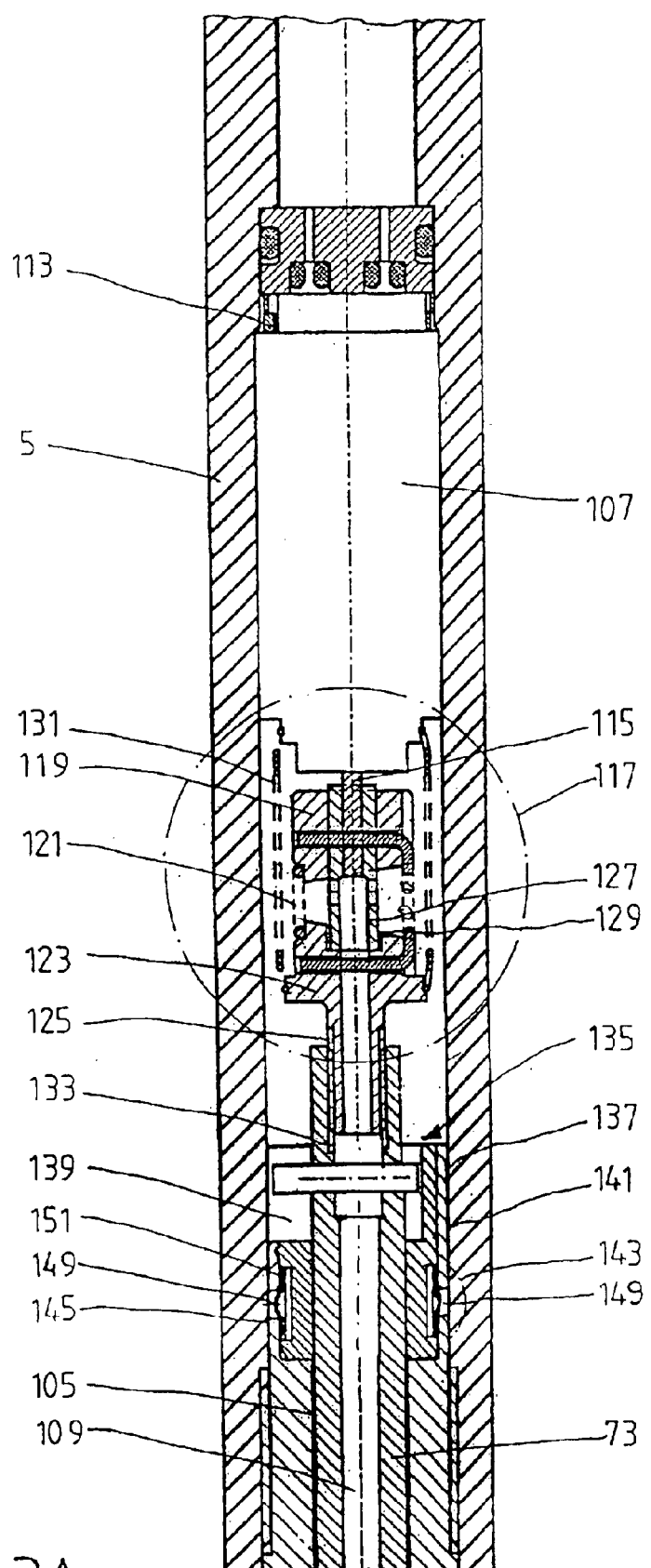
FIG. 3A shows an alternative embodiment of the piston rod.

Underneath an internal thread 133 for the threaded portion 125 of the torque output part 123 there is an anti-rotation safeguard 135 in the form of a transverse pin 137, which is guided in opposite grooves 139 of an adjusting ring 141. The adjusting ring has a latchable rotational retention means 143 relative to the piston-rod extension 23. Formed within the piston-rod extension 23 are receptacles 145, in which latching bodies 147, e.g. spring-loaded latching balls, engage. Alternatively, as shown in FIG. 3A spring-leaf elements 149 of an expanding spring 151 that acts radially outward engage in the receptacles 145. The threaded connection of the internal thread 133 of the valve device 73 to the threaded portion 125 of the output part 123 in combination with the anti-rotation safeguard forms a spindle that converts a rotary motion of the rotor of the actuator into an axial motion of the valve device.

A compression spring 153 (FIG. 2) acting on the lower end of the valve device preloads the valve device 73 in the direction of the clutch 117 and minimizes the thread backlash within the threaded connection between the torque output part and the internal thread of the valve device.

The assembly of the piston with the piston rod includes basic setting of the valve device. At this stage of assembly, the main-stage valve bodies 31; 33 and the components defining the control spaces 39; 41 have not yet been installed. The electric motor 107 is in the hollow piston rod 5 and the valve device 73 is screwed into the piston rod together with the piston-rod extension 23 in combination with the anti-rotation safeguard 135. During this process, the threaded portion 125 of the torque output part 123 engages in the internal thread 133 of the valve device 73. The torsion spring 131 holds the torque output part 123 in the rest position counter to the frictional force within the threaded connection described above.

Damping medium is pumped through the valve space 67 via one of the radial openings 63; 65 within the piston-rod extension 23. At the other of the two radial openings, there must be an envisaged pressure drop at a predetermined flow of medium in conjunction with a defined energization of the electric motor. If this is not the case, a turning tool is inserted into a tool socket 155 at the lower end of the valve device, the intention being to use this tool to adjust the valve device 73 axially relative to the two valve rings 75; 77. If the valve device is turned with a sufficiently large force, the force of the rotational retention means 143 is overcome by means of the transverse pin 137 and the adjusting ring 141, allowing the threaded portion 125 of the torque output part and the valve device 73 to perform a relative motion in the circumferential direction, which simultaneously moves the valve device 73 to a new axial setting. In this new axial setting, the pressure drop between the two radial openings is measured again in conjunction with the given energization. During this setting operation, the preload of the torsion spring remains unchanged since only the frictional force within the threaded connection between the torque output part and the threaded portion of the valve device is effective. This allows arbitrary mechanical adjustment of the axial position of the valve device, which is performed by the restoring force of the spring while the electric motor is deenergized.

Provision can be made, for example, for only 5% of the axial adjustment travel of the adjusting device from the upper end position of the valve device (see FIG. 7) to be traversed at a motor current of, for example, 10% of the adjustment range of the current. This means that the torsion spring 131, which is preloaded in proportion to the current, is also preloaded by 10%. This can be achieved by adjusting the axial basic setting accordingly by means of the rotational retention means 143. At a current intensity of zero, the valve device is necessarily moved into the upper end position by the spring force of the torsion spring 131 since the preload of the torsion spring has an excess restoring force of, for example, 5%. As an alternative, any intermediate position is, of course, possible. It is then merely necessary to allow for the fact that the electric motor 107 must be activated in two directions of rotation, starting from a zero position. The current for activating the driving force of the electric motor and the restoring force of the torsion spring act in opposite rotational directions on the rotor 115 and are always in a defined ratio. If this ratio is determined by calculation or experimentally and stored in a memory (not shown), it is possible directly to infer the position of the valve device 73 driven by means of the spindle from the stored pairs of values for the motor current and the manipulated variable of the actuator/spring force of the torsion spring and to perform the setting of the damping force very accurately.

After this basic setting, the other components forming the piston are fitted and fixed by a cap screw 157, which also seals off the collecting space 111.

During a movement of the piston rod in the direction of the working space 11 remote from the piston rod, damping medium is displaced into the control space 41 through the aperture in the cover disk 61 via the inflow opening 45. The pressure building up in the control space 41 also acts in the valve space 67 via the radial opening 65. Based on the position of the adjusting device 73, a different pressure level is obtained within the control space, the pressure in the control space 41 together with the force of the valve spring 37 determining the closing force on the main-stage valve body.

Figure 4:
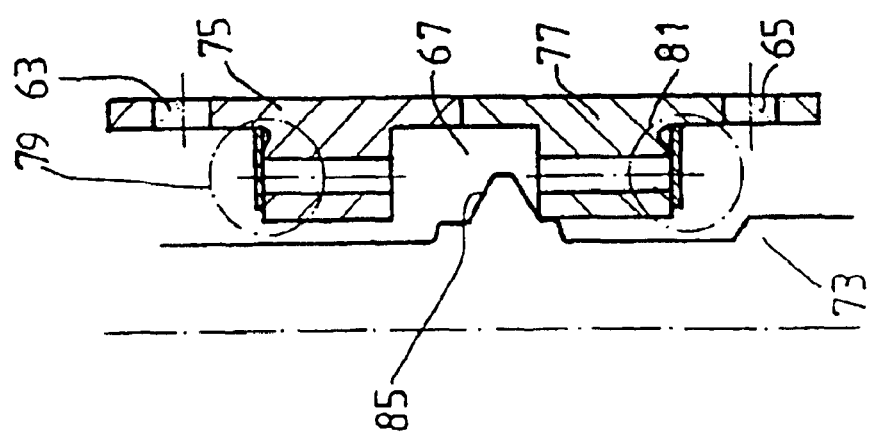

FIG. 4 shows in principle a maximum selection position, in which the valve seat surface 83 comes to rest on the valve ring 77 and, since the nonreturned valve 81 is also closed, the maximum achievable pressure level is present in the control space 41. The opening force in the lower working space 11, which takes effect as a damping force and acts on the main-stage valve body against this pressure level in the control space, must thus also reach a maximum. The pressure level is fundamentally determined by the effective outflow cross section from the control space at the valve device.

During a movement of the piston rod in the direction of the working space 9 at the piston-rod end, the damping medium flows through the cover disk 59 into the control space 39 and on via the radial openings 63 into the valve space 67. In this selection position of the valve device 73, however, the damping medium can flow between the valve ring 75 and the spool surface 85 with the very minimum restriction. Further along the flow path, the nonreturn valve 81 in the valve ring 77 opens, and the damping medium flows through the control space 41 and the cover disk 61 (FIG. 2), which rises from the main-stage valve body, into the lower working space 11. At the same time, a main flow pours along the raised main-stage valve body 31, through the outflow opening 55 and into the main-stage passages 47; 49 and on into the lower working space 11. In this valve device, the minimum backpressure is formed in the control space 39, and hence the minimum damping force is also established in the direction of extension of the piston rod.

Figure 5:
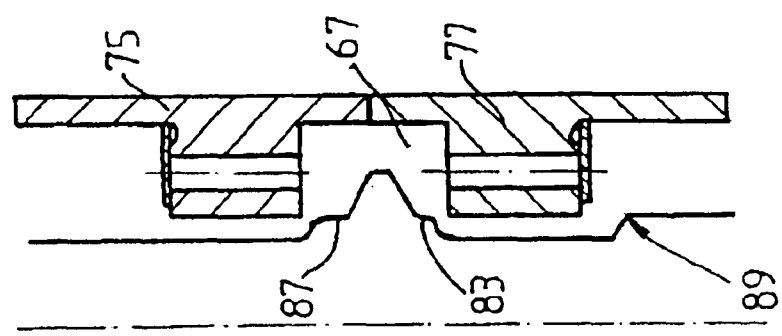

In FIGS. 4 to 7, the flow paths of the damping medium are identical in the region of the main-stage valve bodies. In FIG. 5, the valve device 73 is in a central position, with the result that the maximum flow cross section between the valve device 73 and the two valve rings 75; 77 is available for both directions of flow within the valve space 67.

Figure 6:
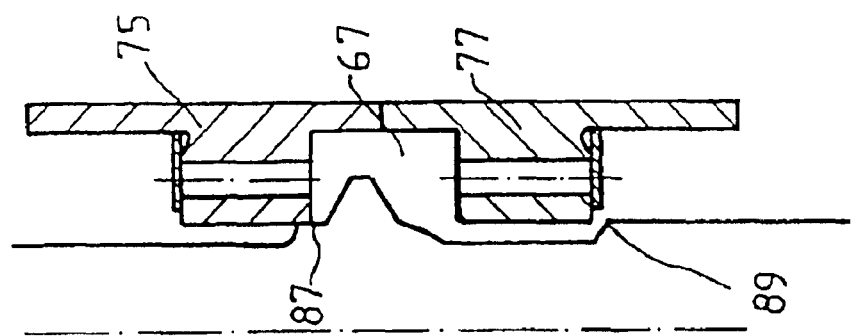

FIG. 6 is intended to illustrate the fact that when the valve-spool surface of the valve device 73 enters into overlap with the inside diameter of tie valve ring 75, the outflow from the control space 39 is at its minimum in the direction of extension of the piston rod and that therefore a maximum damping force is once again established. At the same time, a large cross section is available between the valve-spool surface 89 and the valve ring 77 in the direction of retraction of the piston rod, with the result that, given appropriate flow, starting from the control space, a small damping force is produced by the main-stage valve body.

Figure 7:
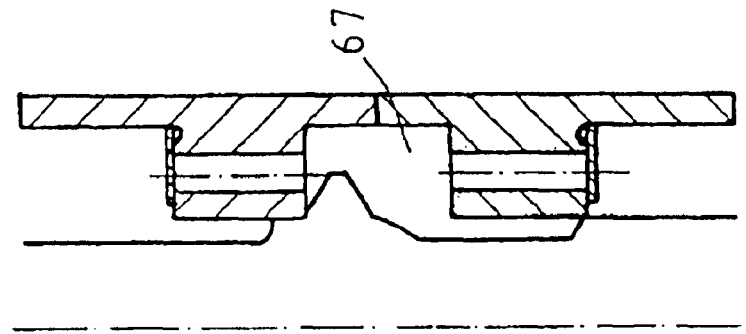
FIGS. 4–7 show selection positions of the valve device.

FIG. 7 reveals that when the valve-spool surfaces 87; 89 enter into overlap with the associated valve rings 75; 77, the maximum damping force is produced in both directions of flow through the valve space 67. This asymmetric adjustment of the damping force in relation to a movement of the valve device 73 is used for damping-force adjustment by the sky-hook principle. FIGS. 4 to 7 have each been used to describe extreme settings in relation to the associated damping forces. Continuously variable intermediate positions are possible with an appropriate actuator, e.g. the electric motor described.

Figure 2:
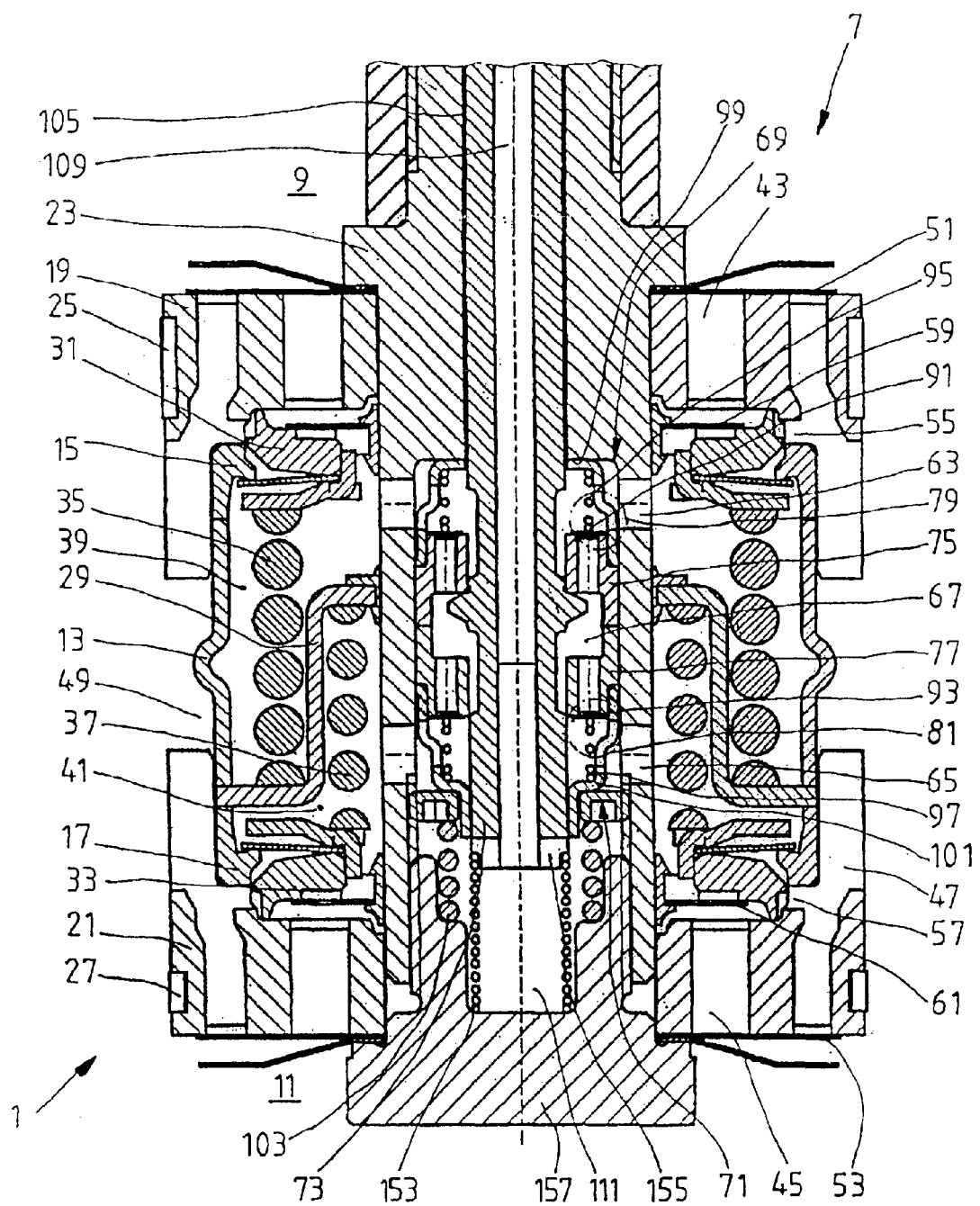
FIG. 2 shows a piston in accordance with FIG. 1 as a separate part.

During an adjusting movement of the adjusting device in accordance with FIGS. 4 to 7, there is no sudden exchange of damping medium between the valve space 67 and the collecting space 111 (FIG. 2). As a consequence, there is no possibility of noise generation, which occurs especially when the damping force is adjusted very quickly from "hard" in the direction of "soft". If an exchange does in fact take place, the gap seals between the piston-rod extension and the valve device and between the valve device and the valve sleeve impose a retardation such that no noise can occur.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. An oscillation damper with a variable damping force, said damper comprising
    a torsion spring which exerts a reaction force,
    an actuator which can be rotated against the reaction force of said torsion spring, said actuator comprising an electric motor, said electric motor comprising a housing and a rotor which is rotatable relative to said housing, said torsion spring being operatively connected between said housing and said rotor, and
    a valve device which can be adjusted by rotating said actuator according to a manipulated variable, said manipulated variable comprising a current for activating a driving force of the electric motor, said valve device having a position which is determined by the current and the reaction force of the torsion spring, the reaction force being in proportion to the current, wherein said current and said reaction force act in opposite rotational directions on said rotor and are always in a defined ratio.

2. An oscillation damper as in claim 1 wherein said torsion spring is a helical spring having a first winding portion fixed to said actuator and a second winding portion fixed to said rotor.

3. An oscillation damper as in claim 1 further comprising
    a drive line arranged between said actuator and said valve device, and
    an overload clutch arranged in said drive line.

4. An oscillation damper as in claim 3 wherein said overload clutch comprises
    a torque input part,
    a torque output part, and
    a spring which clamps said torque input part and said torque output part against each other.

5. An oscillation damper as in claim 4 wherein said spring which clamps said torque input part and said torque against each other is a helical tension spring.

6. An oscillation damper as in claim 5 wherein said helical tension spring is operatively connected to said torque input part and said torque output part.

7. An oscillation damper as in claim 4 wherein one of said torque input part and said torque output part comprises a sleeve and the other of said torque input part and said torque output part comprises a blind opening, said sleeve being received in said blind opening to align said torque input part relative to said torque output part.

8. An oscillation damper with a variable damping force, said damper comprising
- a torsion spring which exerts a reaction force,
- an actuator which can be rotated against the reaction force of said torsion spring,
- a valve device which can be adjusted by rotating said actuator, and
- a spindle connected to said actuator for converting a rotary motion of said actuator to an axial motion of said valve device, said spindle comprising an adjusting ring which can be fixed to a component which is fixed against rotation relative to said actuator, and an anti-rotation safeguard for preventing rotation of said valve device relative to said adjusting ring.

9. An oscillation damper as in claim 8 wherein said anti-rotation safeguard comprises at least one groove in said adjusting ring and a transverse pin which engages in said at least one groove.

10. An oscillation damper as in claim 8 further comprising latching means for fixing said adjusting ring to said component.

11. An oscillation damper as in claim 10 wherein said latching means comprise at least one spring loaded latching body.

12. An oscillation damper as in claim 11 further comprising at least one expanding spring which preloads a respective said at least one spring loaded latching body.

13. An oscillation damper as in claim 11 wherein said latching means comprise at least one expanding spring, each said at least one expanding spring comprising a spring leaf segment which forms a respective said at least one spring loaded latching body.

14. An oscillation damper as in claim 11 wherein said component comprises at least one receptacle, said at least one spring loaded latching body engaging in said at least one receptacle.

15. An oscillation damper as in claim 14 further comprising a piston rod, said component being fixed with respect to said piston rod.

16. An oscillation damper as in claim 15 wherein said piston rod is a hollow piston rod and said component is a piston rod extension fixed to said hollow piston rod, said spindle being received in said hollow piston rod.

17. An oscillation damper as in claim 16 further comprising a compression spring which preloads said spindle relative to said piston rod extension.

* * * * *